Patented July 21, 1936

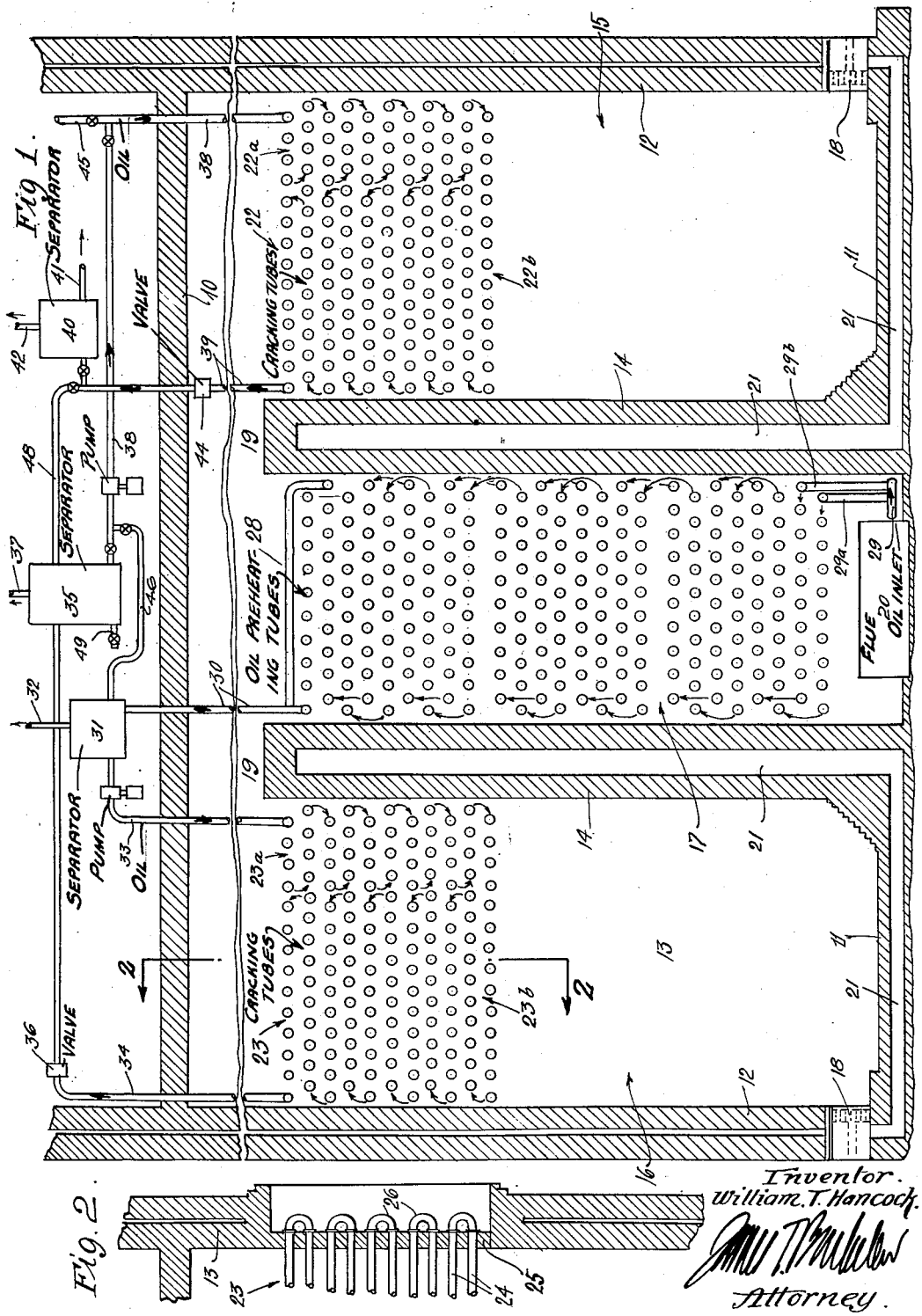

2,048,547

UNITED STATES PATENT OFFICE 2,048,547

TUBE STILL

William T. Hancock, Long Beach, Calif.

Application May 11, 1934, Serial No. 725,111

6 Claims. (Cl. 196—110)

This invention has for its chief object to provide an improved oil heating and cracking still designed to promote greater efficiency in heat transfer between the combustion gases and the oil being heated, and to give substantially greater economies than ordinarily attainable in stills of this general character.

In accordance with the invention, the still is constructed to provide what may be termed two high temperature heating chambers containing tube banks within which preheated oil is heated to cracking or near cracking temperatures. These high temperature heating chambers are separated by spaced baffle walls which form a third heating chamber into which the combustion gases from both of the first mentioned chambers are passed in contact with a bank of tubes to which the oil is fed, and within which the oil is preheated before passage into one or both of the high temperature heating tubes. Preferably the aggregate lengths of the tubes contained within the chamber which receives the combustion gases from both of the high temperature heating chambers, is substantially greater than the aggregate length of the tubes in either of the last mentioned chambers, so that before passing into the cracking zone, the oil is gradually heated over an extended period of time prior to being subjected to cracking temperatures.

High operating efficiency of the unit is accomplished largely by reason of the fact that the hot combustion gases from two high temperature zones are passed into the same chamber containing the oil preheated to the bank, the existing temperature differentials and heat transfer rates in the preheating tubes being substantially greater than when, for example, combustion gases from separate high temperature zones are passed into separate preheating chambers and into contact with separate preheating tubes. The present type of still also is particularly advantageous by reason of the simplicity and compactness with which the entire unit may be constructed.

The oil preferably is passed upwardly through the preheating tube bank and conducted from the upper end of the latter to the upper end of one of the high temperature heating tube banks, suitable means preferably being interposed between the preheating and higher temperature heating stages for the purpose of removing vapors. The oil leaving the high temperature heating tubes may be separated from the vapors and the residuum subjected to further heating and vaporization by passage through the tubes in the second high temperature heating chamber. As an alternative the oil stream passing from the preheating tubes may be split into two portions and these passed separately through the two high temperature heating tube banks, or as a further alternative, any one of the tube banks may be operated independently of either of the others. That is to say, an oil may be subjected to heating or cracking in one tube section of the still without that same oil being then circulated through either or both of the remaining tube sections. Preferably however, the same oil will be circulated through all three heating stages of the still in the manner hereinafter more fully described.

The above mentioned objects of the invention as well as numerous additional features and objects thereof, will be understood to best advantage from the following detailed description. Reference is had throughout the description to the accompanying drawing, which, though illustrative of the invention in its broad aspects, shows only one typical form thereof. In the drawing:

Fig. 1 is a general sectional view of the still showing the heating chambers, tube banks and connections between the several tube banks, certain of the parts being illustrated diagrammatically; and Fig. 2 is a fragmentary section on line 2—2 of Fig. 1, showing a portion of the end wall of the still.

The drawing shows somewhat diagrammatically a still having top and bottom walls 10 and 11, end walls 12 and side walls 13, it being understood of course that the wall construction and arrangement may be subject to variation in accordance with the characteristics and requirements of particular units. Spaced baffle walls 14 divide the interior of the still into three heating chambers, two outer high temperature combustion chambers 15 and 16, and an inner comparatively lower temperature heating chamber 17. Chambers 15 and 16 are fired by means of burners within boxes diagrammatically indicated at 18, the hot combustion gases rising within these two outer chambers and then passing through spaces 19 between the top wall 10 of the still and the tops of baffle walls 14, to then flow downwardly to chamber 17 and out through flue 20 leading from the bottom of chamber 17. Chambers 15 and 16 may be fired to substantially the same temperature, or one may be heated to any suitable temperature higher than the other. In any event, the hot combustion gases from the two outer chambers are combined and caused to flow downward through substantially the full vertical length of chamber 17. The still and baffle walls are here shown to contain the usual heat insulating air spaces 21.

The high temperature heating chambers contain tube banks 22 and 23, each comprising a plurality of tubes in horizontal rows with the tubes of each row, and adjacent rows, connected in series. As shown in Fig. 2, the tubes 24 project through supports 25 within the still walls 13, and are connected at accessible points outside the supports by return bends 26. As indicated by the small arrows, the tubes in each of banks 22 and 23 are interconnected so that oil entering the top, first passes downward through comparatively narrow vertically extending sections 22a, 23a of the tube banks, and then reverses its general direction of flow in passing upwardly through comparatively wide sections 22b, 23b of the tube banks. This particular aspect of the invention, that is, the particular manner in which the tubes in banks 22 and 23 are interconnected and arranged to cause the oil to flow through the described path, is more specifically dealt with in my copending application on Oil cracking still, Ser. No. 724,135, filed May 5, 1934, now issued to U. S. Patent No. 2,034,094, dated March 17, 1936. It will suffice to state herein that my general purpose in causing the oil to flow downwardly through the comparatively narrow tube bank section 22a, 23a is to bring the oil comparatively rapidly up or near the maximum temperature to which it is heated in the particular chamber, and to then hold the oil, with a somewhat gradual temperature diminution for a substantially longer period of time in causing the oil to pass upwardly through the comparatively wide tube bank sections 22b and 23b. It has been found that by heating and maintaining the oil under these conditions at cracking temperatures, high percentage of conversion of heavier into lighter fractions is accomplished with minimum carbon deposits accumulating on the walls of the tubes.

A bank 28 of oil preheating tubes is mounted within the inner chamber 17, there preferably being a substantially greater number of tubes or substantially greater aggregate tube length and tube surface area, in the oil preheating tube banks 28, than in either of the high temperature heating tube banks 22 or 23. The purpose of providing substantially greater tube length in the preheating tube banks is to cause the oil, during preheating, to be heated to the maximum temperature attainable within chamber 17 and to be held at preheating temperatures over an extended length of time. The feed oil is passed into the lower end of tube bank 28 through inlets 29a, 29b leading from header 29, the oil thence flowing upwardly through the tubes in paths indicated by the arrows and in a direction generally countercurrent to the stream of hot gases flowing from chambers 15 and 16 to the flue 20.

The oil preheated in its passage through tube bank 28 flows through line 30 into a flash chamber receptacle 31 which may be of any suitable construction capable of effecting separation of the vapors from the liquid. If desired, a rectifier or dephlegmator may be substituted in place of a simple flash chamber as diagrammatically illustrated at 31. The vapors pass from the separator through line 32 which may lead to a condenser and suitable fractionating equipment, not shown, if desired. The unvaporized oil passes through line 33 to the upper end of the narrow section 23a of tube bank 23, the oil flowing through the tube bank in the path indicated by the arrows, and finally discharging through line 34 into a dephlegmator or separator 35.

In passing through tube bank 23, the oil is subjected to what may be termed preliminary cracking, the oil being heated to cracking temperature but not necessarily to the temperature at which complete conversion of all the hydrocarbons capable of dissociation, will occur. A back pressure is maintained in tubes 23 by means of an orifice valve or fitting 36 placed in the outlet line 34, valve 36 serving to restrict the oil and vapor stream to the extent necessary to maintain the desired pressure and flow rate conditions within the cracking tubes.

The vapors being discharged through line 37 from separator 35 may be fractionated by suitable apparatus, not shown, and the final vapors condensed to produce gasoline. The unvaporized oil or residuum in separator 35 is passed through line 38 to the upper end of section 22a of tube bank 22, the oil flowing down through the narrow section of the tube bank and thence upwardly through the comparatively wide section 22b to be finally discharged through line 39 into a separator or dephlegmator 40. The final residuum may be led off through line 41 to storage, and the vapors taken off via line 42 and then fractionated to produce gasoline.

The oil passing through tube banks 22 is subjected to a final cracking at temperatures preferably somewhat in excess of the temperature to which the oil is heated within tubes 23 in the preliminary cracking stage. An orifice valve on fitting 44 may also be placed in line 39 for the purpose of maintaining a proper back pressure within tube 22, and for the same general purposes stated with reference to valve 36 hereinabove. It may be mentioned that the details and purposes of the orifice valve with relation to the cracking tube are fully set out in my copending application to which reference has heretofore been made.

Instead of cracking the oil by series passage through tube banks 23 and 22, that is instead of first subjecting the oil to preliminary cracking in tubes 23 and then to final cracking in tubes 22, the preheated oil stream flowing through line 30 into separator 31 may be divided, and one part passed through line 33 to tubes 23 and the other portion passed through lines 46 and 38 to tubes 22. In this event, the two high temperature tube banks will be heated to temperatures sufficient to bring about complete conversion or cracking to the desired extent by single passage of the oil through the cracking zones.

Vapors and unvaporized residuum in this case flow from cracking tubes 23 through line 34 to flash chamber 35, as before, and vapors and residuum from tubes 22 may be passed separately through line 39 into flash chamber 40, or they may be combined with the cracked vapor and residuum from tubes 23, by passing them through line 48 into separator 35. The combined cracked vapors may be led off through line 37 for further fractionation and refining, and the residuum discharged through line 49 to storage. In case the oil is subjected only to single stage cracking by dividing the preheated oil stream at separator 31, as just described, it may be necessary to install preheating tubes 28 of larger size than the cracking tubes in order to pass sufficient oil to simultaneously feed both banks of cracking tubes.

With the present type of still, it is also possible to heat or crack oil in a bank of tubes within one of the heating chambers, without previously or subsequently passing that same oil through the tubes within one of the other heating chambers. For example, charging stock to be heated or cracked may be fed through lines 45 and 38 to tube bank 22 and the hot residuum and vapor mixture passed from the tube banks to flash chamber 40, so that the one section of the still is thus operated entirely independent of the others. However, in general practice it will be preferred to preheat the oil in the central tube bank and to then subject that oil to cracking by passing through one or both of the tube banks 22 and 23.

As an example of a typical installation, the still may be built with a preheating tube bank 28 consisting of from 175 to 200 twelve foot length tubes having an inside diameter of four and one half inches. Topped charging stock having a gravity of around 25° A. P. I. and preheated to a temperature in the neighborhood of 300° F. may be passed through the preheating tube bank at the rate of 10,000 barrels per day, although the still of course may be operated only at part capacity. A charging stock may be preheated to a temperature of around 500° F. in which event, in an average instance, the vapors leaving separator 31 will condense to light oil having a gravity in the neighborhood of 45° A. P. I. After passage through the first cracking stage, the oil and vapors at the outlet of tube bank 23 will have a temperature of around 900° F., orifice valve 30 maintaining a back pressure of about 500 lbs. per sq. in. The cracked vapors leaving dephlegmator 35 through line 37 will condense to a light oil of around 45° A. P. I. gravity and the residuum passed via line 38 through the second cracking stage will be heated in tube bank 22 to an outlet temperature of around 950° F. Ordinarily orifice valve 44 will maintain a somewhat higher back pressure, of about 800 lbs. per sq. in., on tube bank 22 than the back pressure maintained by valve 36 on tube bank 23. Vapors resulting from the second cracking stage and discharged through line 42 may be condensed to an oil having a gravity of around 45° A. P. I.

I claim:

1. An oil still comprising walls forming a pair of spaced outer combustion chambers, spaced baffle walls forming an inner chamber between said outer chambers, combustion gases from both of the outer chambers passing into said inner chamber, a bank of oil heating tubes within each of said chambers, an oil inlet at the lower end of the tube bank in said inner chamber, means for passing oil from the upper end of the inner tube bank into the upper end of the tube bank in one of the outer chambers, and means for passing the oil from the last mentioned tube bank into the upper end of the tube bank in the other outer chamber, the tubes in one of the last mentioned banks being interconnected so that the oil coming from a preceding bank flows downwardly through one section of tubes and then passes upwardly through an adjacent section of tubes, the tubes in the last mentioned section having substantially greater aggregate length than the aggregate length of the tubes in the first mentioned section.

2. An oil still comprising walls forming a pair of spaced outer combustion chambers, spaced baffle walls forming an inner chamber between said outer chambers, combustion gases from both of the outer chambers passing into said inner chamber, a bank of oil heating tubes within each of said chambers, an oil inlet at the lower end of the tube bank in said inner chamber, the aggregate length of the tubes in the inner chamber being substantially greater than the aggregate length of the tubes in either of the outer chambers, means for passing oil from the upper end of the inner tube bank into the upper end of the tube bank in one of the outer chambers, and means for passing the oil from the last mentioned tube bank into the upper end of the tube bank in the other outer chamber, the tubes in one of the last mentioned banks being interconnected so that the oil coming from a preceding bank flows downwardly through one section of tubes and then passes upwardly through an adjacent section of tubes, the tubes in the last mentioned section having substantially greater aggregate length than the aggregate length of the tubes in the first mentioned section.

3. An oil still comprising walls forming a pair of spaced outer combustion chambers, spaced baffle walls forming an inner chamber between said outer chambers, combustion gases from both of the outer chambers passing into said inner chamber, a bank of horizontal oil heating tubes within each of said chambers, and means for passing oil from the tubes in said inner chamber through the tube banks in both of the outer chambers, the tubes in one of the last mentioned banks being interconnected in series so that the oil flows downwardly through one vertically extending section of tubes and then passes upwardly through an adjacent vertically extending section of tubes, the tubes in the last mentioned section having substantially greater aggregate length than the aggregate length of the tubes in the first mentioned section.

4. An oil still comprising walls forming a pair of spaced outer combustion chambers, spaced baffle walls forming an inner chamber between said outer chambers, combustion gases from both of the outer chambers passing into said inner chamber, a bank of oil heating tubes within each of said chambers, and means for passing oil from the tubes in said inner chamber through the tube banks in both of the outer chambers, the tubes in one of the last mentioned banks being interconnected so that the oil coming from a preceding bank may flow downwardly through one vertically extending and comparatively narrow section of tubes and then passes upwardly through an adjacent vertically extending and substantially wider section of tubes, the tubes in the last mentioned section having substantially greater aggregate length than the aggregate length of the tubes in the first mentioned section.

5. An oil still comprising walls forming a pair of spaced outer combustion chambers, spaced baffle walls forming an inner chamber between said outer chambers, combustion gases from both of the outer chambers passing into said inner chamber, a bank of oil heating tubes within each of said chambers, means for passing a stream of oil first through the tubes in said inner chamber and then through the tubes in one of said outer chambers, an outlet line, means valve controlled for passing said oil stream from the last mentioned tubes either to said outlet line or through the tubes in the other outer chamber, and means for separating vapors from the oil stream leaving the tubes in said inner chamber and before the oil enters the tubes in either of the outer chambers.

6. An oil still comprising walls forming a pair of spaced outer combustion chambers, spaced baffle walls forming an inner chamber between said outer chambers, combustion gases from both of the outer chambers passing into said inner chamber, a bank of oil heating tubes within each of said chambers, an oil inlet at one end of the tube bank in said inner chamber, and means for passing oil from the upper end of the inner tube bank through tubes in the tube banks in both of the outer chambers, the last mentioned means including means whereby separate portions of the liquid oil stream coming from said inner tube bank may be passed respectively through the outer tube banks, or whereby the entire stream may be passed through one and then the other of said outer tube banks.

WILLIAM T. HANCOCK.